No. 656,680.  
E. THOMSON.  
SYSTEM OF ELECTRICAL DISTRIBUTION.  
(Application filed June 12, 1899.)  
(No Model.)

Patented Aug. 28, 1900.

Witnesses.  
Edward Williams, Jr.  
Benjamin B. Hull

Inventor.  
Elihu Thomson,  
by Albert G. Davis  
Atty.

UNITED STATES PATENT OFFICE.

ELIHU THOMSON, OF SWAMPSCOTT, MASSACHUSETTS, ASSIGNOR TO THE GENERAL ELECTRIC COMPANY, OF NEW YORK.

SYSTEM OF ELECTRICAL DISTRIBUTION.

SPECIFICATION forming part of Letters Patent No. 656,680, dated August 28, 1900.

Application filed June 12, 1899. Serial No. 720,294. (No model.)

*To all whom it may concern:*

Be it known that I, ELIHU THOMSON, a citizen of the United States, residing at Swampscott, county of Essex, State of Massachusetts, have invented certain new and useful Improvements in Systems of Electrical Distribution, (Case No. 874,) of which the following is a specification.

My present invention relates to safety devices for alternating-current systems. Its particular object is to cut entirely out of action any transformer or other translating device which proves defective and to prevent injury to apparatus or the consumers in the branch line from such an accident—for example, as when primary current passes into the secondary system by puncture of the insulation. This object I attain by causing current to flow through a cut-out device on a puncture of the insulation, and thereby open the circuit. The cut-out may be operated by leakage through what is known as the "grounded sheath" or the frame of the transformer or translating device or the secondary circuit, and serves to open a primary main connection of the transformer of the supply-circuit of a translating device of other character. In one of the best embodiments of my invention I provide a double-pole circuit-breaker in the primary with means for tripping it when current passes from the sheath of the transformer to ground.

For a transformer under ordinary conditions of service the grounded sheath is the best way of applying the invention. I may, however, attain the results which I seek by other connections, some of which I indicate. For example, I may operate the circuit-opening means by a connection from one of the secondary lines in a two-wire system or from the neutral in a three-wire system or from the frame or casing of the transformer or translating device.

The accompanying drawings show in diagram arrangements within the invention.

Figure 1:
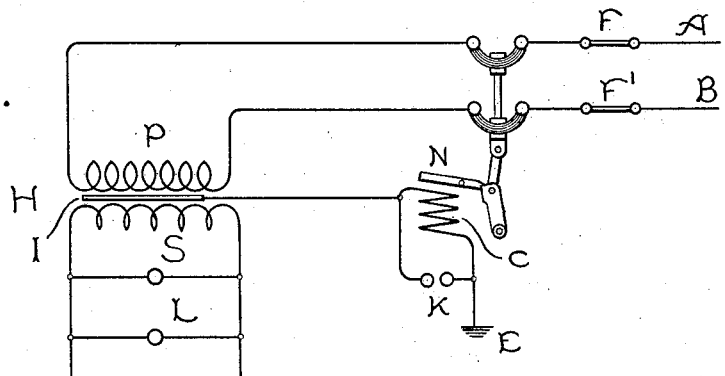
Figure 2:
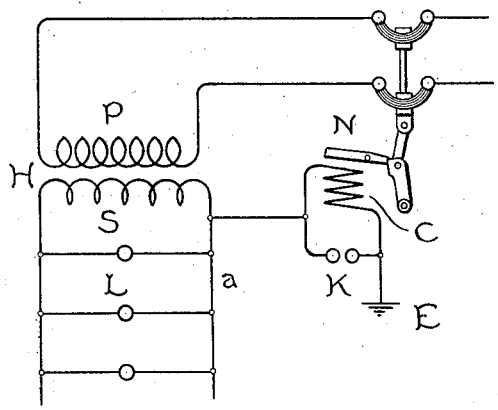

Figure 1 shows the circuit-opening means connected to the sheath of a transformer. In Fig. 2 it is connected to one side of a two-wire system, in Fig. 3 to the neutral of the three-wire secondary system, and in Fig. 4 to the box of the transformer.

In Fig. 1, H is a transformer which is supplied from the primary mains A B, its primary P being connected to these mains and being protected against accidental short-circuit by the fuses F F' in the ordinary way. S is the secondary-supplying lamps L or other consuming devices. Of course any load whatever may be put upon it. The sheath I is of copper or other conducting material and is interposed between the two windings in the usual way, a detailed description of which is unnecessary. Connected to the sheath is the coil C of an electromagnetic circuit-breaker N. A spark-gap K bridges the coils. The connection from the sheath to ground may either be solid metal or have the well-known film cut-out interposed. I have not deemed it necessary to illustrate this, because its construction and application are well known.

The operation of the parts thus described is as follows: Assume that current flows from the primary to the sheath I as a result of direct lightning stroke, induced discharge, or defective insulation. In this case if there be a second ground upon the primary lines, (which may nearly always be assumed in any extensive system of distribution) or even if there be sufficient capacity in the line, a rush of current will pass through the connection from the sheath or other leakage-point to earth at E, and, in general, the potential will be so high that the discharge will pass the gap K, while more or less of the current which follows the discharge will pass through the coils C, opening the circuit-breaker which bridges the gaps in the primary lines.

In Fig. 2 the parts are illustrated as before; but in this case the coil C is connected between the main $a$ of the secondary distribution and ground, which arrangement will protect the transformer not only in case of puncture of insulation followed by discharge into the secondary, but also in case of other accidents, such as the grounding of opposite sides of the secondary distribution.

Figure 3:
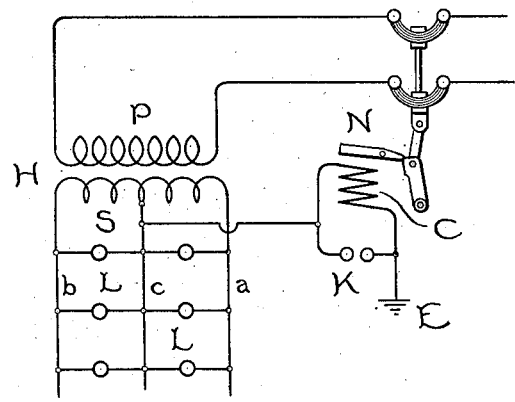

In Fig. 3 I show the application of the invention to the well-known three-wire system, where the mains $a$ $b$ $c$ are the positive, negative, and neutral, respectively. Here it is best to connect the circuit-breaker to the neutral, which is in many installations likely to be grounded at all times. The action in this case is substantially like that in Fig. 2, except that both sides of the three-wire system are protected.

Figure 4:
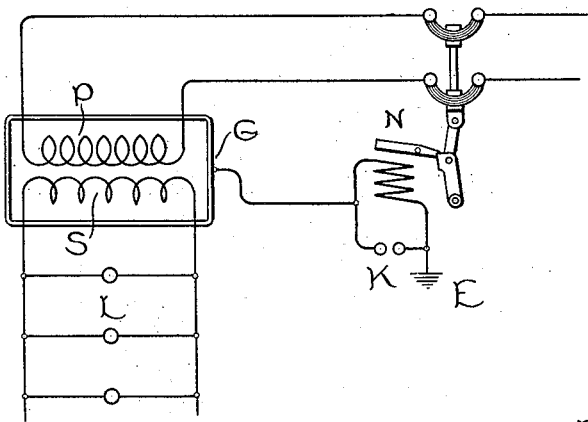

In Fig. 4 the box G of the transformer is used as a ground connection. This is not so good an arrangement as that in the other figures, because it might occur that the insulation between the primary and secondary coils would be punctured without bringing the box into circuit. Nevertheless, the invention may be usefully applied in this way, and this is a good example of a mode of protecting other types of devices than transformers.

In all of the figures I show as the preferred form for the purposes of this case the electromagnetic circuit-breaker opening the primary line, but not directly dependent upon the current in the primary. Any usual or customary protection against undue current in the primary, such as the fuses F F', may be employed in addition to the invention herein set out.

While the invention herein described is especially designed for use in connection with transformers and will have its principal field of use with them, it is also applicable to any translating device fed with or carrying high-tension currents and which it is desirable to cut out upon failure of the insulation.

What I claim as new, and desire to secure by Letters Patent of the United States, is—

1. The combination of a transformer, with mechanical means for opening the primary circuit, brought into action by the puncture of the transformer insulation.

2. The combination with a transformer, of an electromagnetic circuit-breaker in the primary circuit for opening the primary lines, and a connection from the transformer to ground including the coils of the circuit-breaker, said connection being closely related to the primary circuit but normally insulated therefrom.

3. The combination with a transformer, of an electromagnetic circuit-breaker, the coil of which is included in a circuit between the transformer and ground disconnected from the primary, and contacts operated by the circuit-breaker for opening the primary circuit.

4. The combination with the grounded sheath of a transformer, of a circuit-breaker for opening the primary leads, the operating-coil of which is included in the grounded connection.

5. The combination with the primary lines leading to a transformer, of a common means for opening the primary circuit operated by either the puncture of the transformer insulation or a ground in the secondary distribution.

6. The combination with a transformer or other translating device, of a circuit-breaker in the supply-circuit, and a coil controlling said circuit-breaker in a branch circuit, normally open at a point closely related to the winding of the translating device, so as to be energized upon rupture of the insulation.

7. The combination with a transformer or other translating device, of a circuit-breaker in the supply-circuit, and a coil controlling said circuit-breaker in a ground branch normally open at a point closely related to the winding of the translating device, so as to be energized upon rupture of the insulation.

In witness whereof I have hereunto set my hand this 9th day of June, 1899.

ELIHU THOMSON.

Witnesses:
DUGALD McKILLOP,
HENRY O. WESTENDARP.